Oct. 10, 1933.  E. M. LONG  1,929,534
MACHINE FOR MARKING PARTIALLY FINISHED LENS BLANKS
Filed April 27, 1928  3 Sheets-Sheet 1
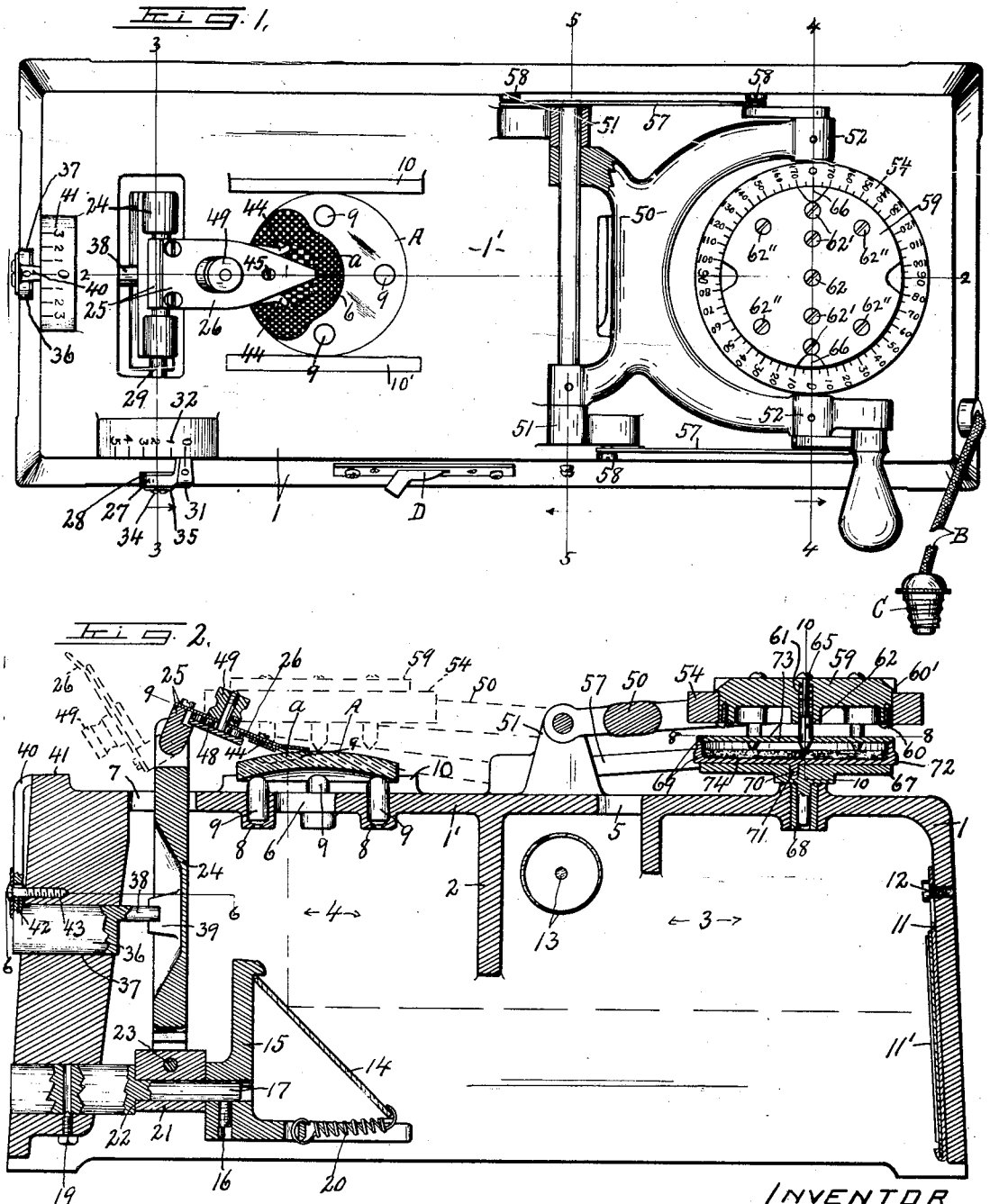
INVENTOR
E. M. Long
BY
Denism & Thompson
ATTORNEYS
WITNESS
J. T. Mains Oct. 10, 1933.  E. M. LONG  1,929,534
MACHINE FOR MARKING PARTIALLY FINISHED LENS BLANKS
Filed April 27, 1928  3 Sheets-Sheet 2
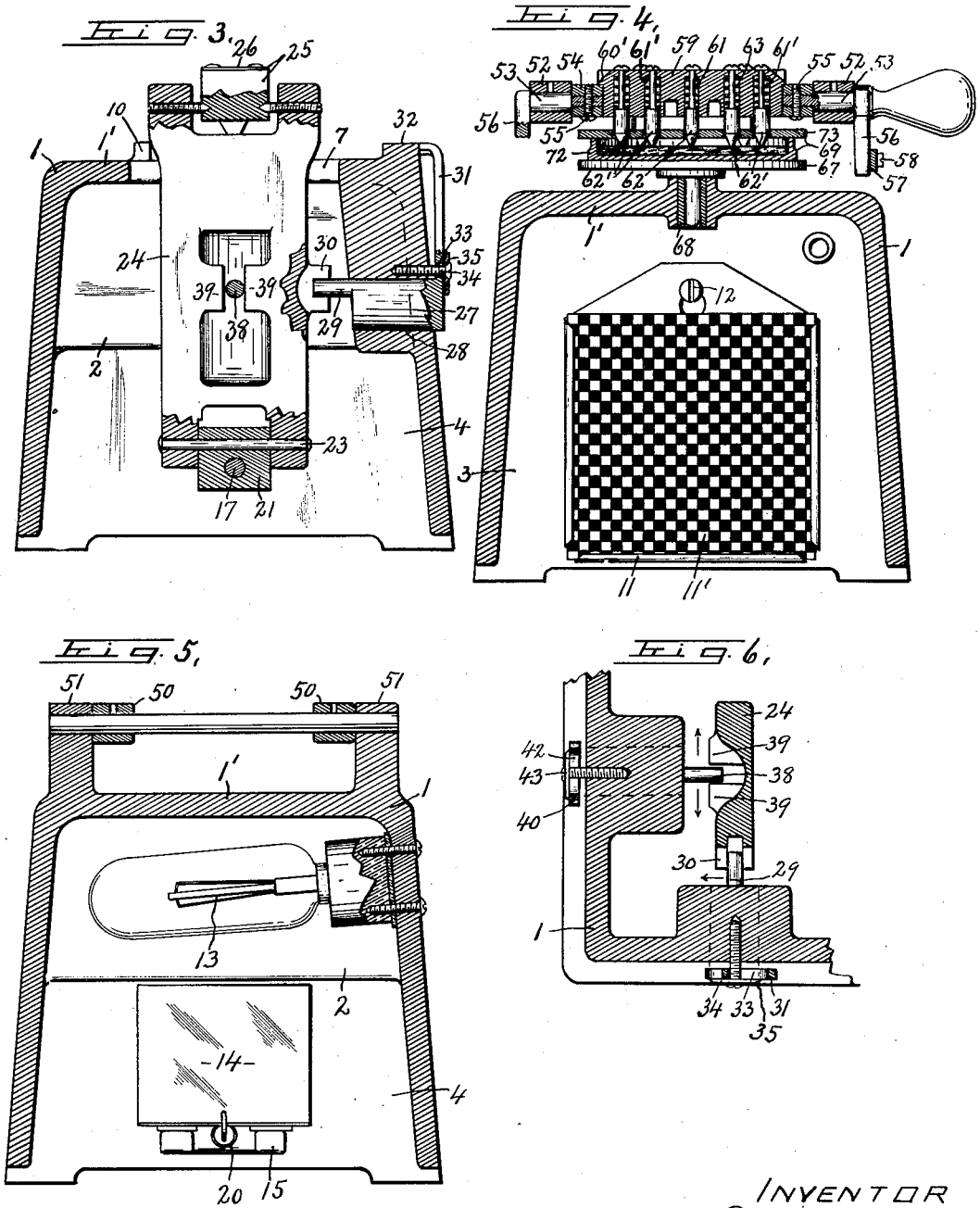

Oct. 10, 1933.   E. M. LONG   1,929,534
MACHINE FOR MARKING PARTIALLY FINISHED LENS BLANKS
Filed April 27, 1928   3 Sheets-Sheet 3
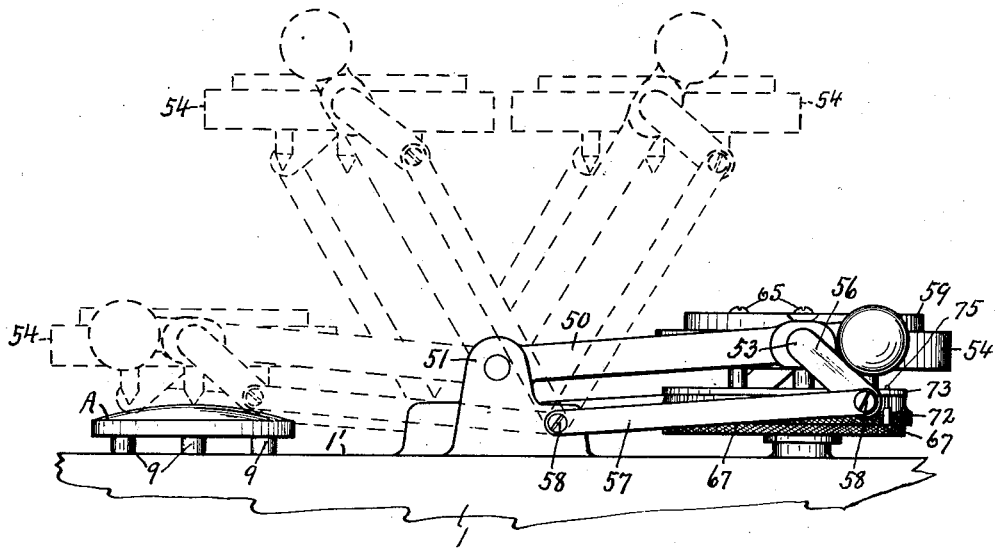
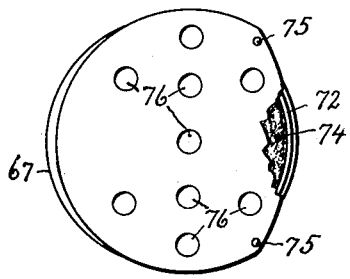
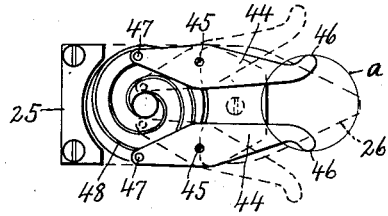
WITNESS
J. T. Mains
INVENTOR
E. M. Long
BY
Denison & Thompson
ATTORNEYS Patented Oct. 10, 1933

1,929,534

UNITED STATES PATENT OFFICE 1,929,534

MACHINE FOR MARKING PARTIALLY FINISHED LENS BLANKS

Eli Maynard Long, Geneva, N. Y., assignor to Shuron Optical Company, Inc., Geneva, N. Y., a corporation of New York Application April 27, 1928. Serial No. 273,384

5 Claims. (Cl. 88—56)

This invention relates to a machine for locating the relative positions of the segments, optical centers and axes of semi-finished bifocal lens-blanks according to certain prescriptions preparatory to finishing the lenses according to other coordinated prescriptions as may be required in the production of various forms of one piece bifocal lenses.

The lens-blanks to be operated upon by this machine are preferably made in the form of circular bodies of suitable glass with the segments incorporated therein and one surface of the body ground and polished to the contour required for the finished lens leaving the other surface to be ground and polished to a certain prescribed coordinated contour with the previously finished contour in such manner that when the lens is cut from the blank, finished and mounted its optical properties will conform to certain predetermined prescriptions required to correct certain defects in the eyes of the user.

The main object of the present invention is to provide simple and efficient means for expeditiously locating the relative positions of the segments, optical centers and axes as they should appear in the finished lenses according to certain predetermined formula or prescriptions and at the same time to mark upon the finished surface of the lens-blank the desired positions of the optical centers and axes in their prescribed relation to the segments so that the marked lenses may be accurately positioned in the grinding and polishing machine for finishing the unfinished surface according to a prescribed formula.

The segments formed in the one piece bifocal lens-blanks even when one of the surfaces is finished are not always visually discernible and it would, therefore, be difficult to properly position the segment in the machine, in proper relation to the marker without some means for producing a visual contrast between the segment and adjacent portions of the body of the lens-blank and one of the specific objects of this invention is to provide means whereby when the lens is placed in the machine the outline of the segment will be visually contrasted with the remaining portions of the blank by the use of an illuminated screen or target and a reflector so placed that the reflected light will pass through the segment and adjacent portion of the lens-blank and the portion of the target reflected through the segment will be considerably magnified over the portions of the target reflected through the remaining portions of the blank to more clearly define the outline of the segment.

Another object is to provide means whereby the mechanical center of the lens-blank may be accurately placed in the longitudinal plane of movement of the center pin of the marking device.

A further object is to provide a segment locator adjustable in one direction across the finished surface of the lens-blank to indicate the amount of "drop" of the segment relatively to the point of engagement of the center marking point with said surface and also adjustable in a different direction, preferably at right angles to the first-named adjustment, to indicate the degree of "inset" to one side or the other of the plane of movement of the center pin of the marker.

Another object is to enable the segment locator to be adjusted to and from the finished surface of the lens blank.

Another object is to provide the machine with an ink pad holder and a marker-supporting carrier mounted and carried in such manner that the marker may be moved from engagement with the ink pad into engagement with the surface of the lens blank and vice versa for transferring marks from the pad to the lens-blank and at the same time to keep the marking points at the same side of the holder in all positions of adjustment of the carrier.

A further object is to provide the carrier with an angularly adjustable holder having a diametrical row of yielding marking pins adapted to be moved alternately into engagement with the inking pad and with the lens-blank for marking the optical center and axis of the finished lens upon the finished surface of the unfinished lens-blank.

Another object is to enable the ink pad to be adjusted rotarily with the marker to avoid mutilation of the ink pad by the marking pins as the latter are adjusted rotarily according to the degree or angle of the optical axis produced by the marking pins upon the unfinished lens-blank.

Another object is to provide means whereby the ink pad holder may be adjusted rotarily and preferably eccentrically to present different portions of the pad to the marking points.

Other objects and uses relating to specific parts of the machine will be brought out in the following description.

In the drawings:—

Figure 1 is a top plan of a machine embodying the various features of my invention.

Figure 2 is a longitudinal vertical sectional view taken in the plane of line 2—2, Figure 1.

Figures 3, 4 and 5 are transverse vertical sectional views taken respectively in the planes of lines 3—3, 4—4 and 5—5, Figure 1.

Figure 6 is a detail sectional view taken in the plane of line 6—6, Figure 2.

Figure 7 is an enlarged side elevation of the upper portion of the frame or housing showing the relative positions of the lens support and marking mechanism, which latter is shown by dotted lines in different positions.

Figure 8 is a top plan, partly broken away, of the detached ink well and its support taken in the plane of line 8—8, Figure 2.

Figure 9 is a top plan of the detached lens-segment locator, taken in the plane of line 9—9, Figure 2.

Figure 10 is an enlarged detail sectional view taken in the plane of line 10—10, Figure 2.

As illustrated, this machine comprises a main supporting frame or housing —1— upon which is mounted a support for the lens-blank, a gage to which the lens blank may be set preparatory to positioning its segment relatively to said prescribed optical center and axis as determined by the marking points, illuminated means for visually locating the segment in the blank, a segment locator or gage to which the segment of the lens-blank may be set to determine the amount of "drop" or "inset" of the segment relatively to the optical center according to certain prescribed formula, and a marker mechanism by which the prescribed optical centers and axes may be impressed upon the finished surface of the lens-blank.

*Frame or housing*

The main supporting frame or housing is preferably made in the form of an inverted box-like structure open at the bottom with suitable ventilating spaces and provided with a substantially horizontal top shelf or work-table —1'— with downwardly extending marginal flanges around the four sides thereof, the lower faces of the corners of the frame being also disposed in a substantially horizontal plane so as to rest solidly upon a bench support.

The frame is substantially rectangular in top plan and elongated in one direction and is provided intermediate its ends with a partition —2— extending downwardly from the top wall —1'— approximately half the vertical height of the frame thereby dividing the upper portion of the interior of the housing rear and front compartments —3— and —4— for receiving the light-producing and target reflecting mediums hereinafter described.

The top wall of the rear compartment —3— is provided with a ventilating opening —5— adjacent the source of light to relieve said compartment from excessive heat.

The top wall of the front compartment —4— is provided with a sight opening —6— directly over the light-reflecting medium to allow the reflected rays of light to pass upwardly therethrough, said top wall of the compartment —4— being also provided with an additional opening —7— in front of the opening —6— for receiving a movable part of the segment-locator, presently described.

*Supporting means for the lens-blank*

The top wall of the compartment —4— is provided with a series of, in this instance four, vertical sockets —8— arranged in uniformly spaced relation circumferentially about a common axis which, in this instance, is located in the longitudinal center of the top wall of the housing and is coincident with the center marking point of the marker when the latter is moved to the position for marking the lens, two of said sockets being located in the longitudinal center of the top of the frame while the other two are located in a plane at right angles to and at opposite sides of said longitudinal center.

Seated in these sockets are a corresponding number of resilient posts —9— of soft rubber or equivalent material having their upper ends projecting uniform distances above the upper surface of the top —1'— of the frame for receiving and supporting the lens blank as —A— to be marked, said resilient posts serving the double purpose of reducing the liability of breakage of the lens-blank in contact therewith and also for frictionally holding the blank against movement when positioned for marking.

In some instances, as for example, in the "Kryptok" lens, the segment is preferably fused in the convex side of the blank and the blank is usually circular and of predetermined diameter, while in other instances, as for example, in the "Ultex" lens the segment is preferably ground in the concave side of the blank and the latter is usually rectangular on three of its sides and circular on its fourth side and of standardized form and size.

In each case, however, the segment side of the blank is prefinished to the required contour preparatory to marking and during the marking operation the blank is supported upon the posts —9— with its unfinished surface in contact with the upper ends of the posts.

In order that the lens-blank together with its segment may be properly positioned upon the posts for marking, the top wall —1'— of the frame —1— is provided with one or more gages —10— extending longitudinally thereof at one or both sides of the sight opening —6— a distance from the axis around which the posts —9— are arranged substantially equal to one-half the width or diameter of the lens-blank so that the lens blank may be moved by hand across and upon the upper ends of the post —9— to bring its perimeter in approximate alinement with the gages —10— thereby assuring the maintenance of the center of the blank in the longitudinal center of the top wall —1'— of the housing and in the vertical plane of movement of the center pin of the marker.

*Illuminated segment locator*

A target holder —11— having a target —11'— is secured by a screw —12— or equivalent fastening means to the inner face of the rear end wall of the frace —1— so that the target may face forwardly, the inner face of said target being divided into a multiplicity of relatively small squares, adjacent ones of which are contrasted in color somewhat in the manner of a checker board.

An incandescent electric lamp —13— or equivalent source of light is placed in the upper front portion of the compartment —3— between the top wall of said compartment and the horizontal plane of the lower edge of the partition —2— for the purpose of the illuminating of the front face of the target —11— and preventing the direct rays from passing to the reflector, presently described.

A light reflector —14— is mounted upon a suitable supporting frame —15— within the lower front portion of the front compartment —4— and directly below the sight opening —6—, said reflector being disposed at an angle of substantially forty-five degrees with its reflecting side facing the target —11'— so that the illuminated target will be reflected through the sight opening —6— and thence through the overlying portion of the lens blank —A— under which conditions the portion of the reflected target included in the area of the segment —a— of the lens-blank will be more or less magnified over those portions of the target which are reflected to the remaining portions of the lens blank thereby making a visual distinction or contrast between those parts to more clearly visually outline the segment.

This contrast is further augmented by the contrasting colors in the squares of the target but obviously various other forms of target might be used without departing from the spirit of this invention.

The bracket —15— is secured by a set screw —16— to the inner end of a stud —17— having its outer end secured by a screw —19— in an opening in the front end wall of the housing —1— as shown more clearly in Figure 2.

A spring —20— is operatively connected to the lower front edge of the mirror —14— and to the bracket —15— for holding the mirror in its operative position and permitting it to be removed or replaced when desired.

The stud —17— is disposed in substantially the vertical plane of the longitudinal center of the housing —1— and, therefore, in substantially the plane of movement of the center marking pin.

Lens segment locator

A yoke member —21— is journaled upon the stud —17— between the relatively stationary bracket —15— and a shoulder —22— on said stud directly in front of the front end wall of the housing and upon this yoke member is pivoted at —23— the lower end of an upwardly extending lever —24— having its upper end projecting through the opening —7— in the top wall of the compartment —4— in front of the sight opening —6—.

The pivotal pin —23— is disposed at right angles to the axis of the stud —17— to permit front and rear rocking movement of the lever while the pivotal mounting of the yoke member —21— upon the stud —17— permits the lever and yoke member to rock in unison about the axis of the stud.

This compound movement in directions at right angles to each other is utilized in locating the amount of prescribed "drop" and "inset" of the lens segment relatively to the optical center and axis of the finished lens according to predetermined prescriptions.

The upper end of the lever —24— above the top wall of the compartment —4— is bifurcated for receivnig one of the arms of a bell-crank-lever —25—, said arm of the bell-crank-lever being provided with opposite laterally projecting coaxial bearings journaled on screw trunnions —24'— in the opposite arms of the upper end of the lever —24— to permit the bell-crank-lever to swing about an axis parallel with the axis of the pivotal pin —23— or at right angles to the axis of the stud —17—.

This bell-crank-lever is provided with a rearwardly projecting plate —26— having its rear end pointed and adapted to be moved into and out of engagement with the upper surface of the lens-blank to be marked.

The means for effecting the forward and rearward movement of the lever —24— comprises, in this instance, a rock shaft —27—, Figure 3, journaled in a bearing or opening —28— in one side, preferably the right hand side, of the frame —1— to rotate about an axis parallel with the pivotal pin —23—, said rock shaft having its inner end provided with an eccentric bearing pin —29— adapted to enter between and engage a pair of opposed lugs —30— on the adjacent upright edge of the lever —24—, whereby the rocking movement of the shaft —27— in reverse directions will effect a corresponding oscillating movement of the lever and parts carried thereby.

The outer end of the rock shaft —27— is provided with an upwardly extending pointer —31—, the free end of which is movable along a graduated scale —32— on the upper face of the adjacent side of the frame —1—, as shown more clearly in Figure 1, said graduations varying in value from zero up and representing in millimeters the amount of drop of the lens segment below the optical center of the finished lens according to prescribed formula.

The portion of the arm —31— between the axis of the rock shaft —27— and free end of the pointer is provided with a transverse slot —33— concentric with the axis of the shaft —27— for receiving a screw —34— having a head —35— adapted to engage the outer face of the pointer so that when tightened the free end of the pointer will be frictionally held against the adjacent side face of the frame —1— against accidental displacement.

The lever —24— and pointer plate —26— are so relatively arranged that when the pointer —31— is set to its zero position the free end of the pointer plate —26— will be in the vertical plane of the axes of the opposite side posts —9— which will also be in the vertical plane of contact of the center marking pin when the marker is moved to its marking position.

It, therefore, follows that the movement of the pointer —31— and resultant movement of the lever —24— from the zero position will cause a corresponding movement of the point of the plate —26— from the transverse plane of the axes of the side posts —9— and marking point of the center pin of the marker, the degree of adjustment from the zero position representing millimeters and is made according to a prescribed formula.

The means for effecting the transverse adjustment of the lever —24— and pointer plate —26— carried thereby for indicating the amount of inset of the segment relatively to the marking point of the center pin of the marker and incidentally relatively to the vertical plane of the axes of the front and rear posts —9— comprises a rock shaft —36— journaled in an opening —37— in the front end wall of the frame —1— with its axis parallel with and in the vertical plane of the axis of the stud —17— and, therefore, at right angles to the axis of the rock shaft —27—, the inner end of said rock shaft —36— being provided with an eccentric pin —38— interposed between and in engagement with a pair of laterally spaced lugs —39— on the lever —24—, as shown more clearly in Figures 2 and 6.

The outer end of the rock shaft —36— is provided with a pointer —40— movable along a graduated scale —41— on the upper surface of the adjacent end wall of the frame —1—, said scale being graduated in opposite directions from a zero position to indicate progressively increasing values in millimeters and thereby to determine the amount of "inset" of the lens-segment with reference to the longitudinal center of the machine or longitudinal vertical plane of movement of the center pin of the marker.

The pivotal connection of the bell-crank-lever —25— with the upper end of the lever —24— permits the pointer plate —26— to be moved from the position shown by full lines in contact with the upper surface of the lens-blank, as shown in Figure 2, to the position shown by dotted lines in the same figure or to opposite sides in the vertical plane of its axis where it is self-supporting in either position.

The pointer arm —40— is provided intermediate its ends with a transverse slot —42— for receiving a screw —43— which engages in a threaded aperture in the adjacent end wall of the frame —1— and has its outer end provided with a head engaging the outer face of the pointer arm for frictionally holding the latter in engagement with the adjacent end face of the frame against accidental movement from its adjusted position.

A pair of laterally opposed caliper levers —44— are pivoted intermediate their ends at —45— to the pointer plate —26— at opposite sides of the longitudinal center thereof and to extend forwardly and rearwardly from their respective pivots, as shown in Figure 9.

The rear arms of these levers —44— are of equal length and terminate in outwardly projecting points —46— which are located in a transverse plane a distance from the point of the member —26— substantially equal to the radius of the lens segment so that the three points may be positioned to register with three points in the circumference of said segment as shown in Figures 1 and 9.

The front arms of the levers —44— are of equal length and are provided with pins —47— engaged by a rotary cam —48— which is journaled on the underside of the intermediate portion of the pointer plate —26— and is provided with an exposed handle —49— by which the cam may be rotated for simultaneously moving the levers —44— through equal arcs in opposite directions about their respective pivots, the object of which is to bring the points —46— in registration with the periphery of the segment —a—.

*Marking mechanism*

A carrier frame —50— is pivotally mounted at one end in suitable bearings —51— on the top wall of the frame —1— to swing about a horizontal axis at right angles to the longitudinal center of the machine and has its opposite ends bifurcated and provided with transversely spaced coaxial bearings —52— parallel with the bearings —51— for receiving a pair of coaxial studs —53— having their inner ends projecting toward each other beyond the corresponding bearings —52— for receiving and supporting a ring —54— which is secured to the inner ends of the studs by screws —55—, Fig. 4, or equivalent fastening means, the studs being engaged in diametrically opposite radial openings in said ring.

The outer ends of the studs —53— are provided with similar crank arms —56— which are connected by links —57— to the bases of the bearings —51— through the medium of pivotal pins —58— and in such manner as to maintain the ring in a horizontal plane in all positions of adjustment of the carrier —50— from the inking position to the marking position, and vice versa.

The distance between the axes of the bearings —51— and —52— is substantially equal to the distance between the axis of the bearing —51— and vertical plane of the axes of the opposite side posts —9— so that when the carrier —50— is moved from its inking position to its marking position the axis of the bearings —52— will be in the vertical plane of the axes of the side posts or midway between the front and rear posts along the longitudinal center of the machine.

The bearings —52— are disposed equal distances from and at opposite sides of the longitudinal center of the machine and, therefore, when the ring —54— is supported in the manner described between and upon said bearings —52— the center or axis of the ring will be disposed in a vertical plane of the front and rear posts —9— or midway between the side posts.

The upper surface of the ring —54— is provided with diametrically opposite series of graduations gradually increasing in value from zero at one side to 180 degrees at the opposite sides, the 180 degrees graduation being also indicated by zero and both zero graduations being located lengthwise of the axis of the bearings —52—.

One set of graduations is used to indicate the degree of angular adjustment of the marking pins from the zero position for marking on convex surfaces and the other set for marking upon concave surfaces.

A circular tool-supporting block —59— is journaled for relative rotation within and upon the ring —54— coaxial therewith and is held against axial displacement in said ring by lower and upper shoulders —60—, and —60'—, Figures 2 and 4, the lower shoulders —60— consisting of the heads of screws which are engaged in threaded apertures in the underside of the circular block —59— so that the latter may be removed when desired by simply removing the screws —60—.

This circular block —59— is provided with a central coaxial socket —61— and similar additional sockets —61'— at opposite sides of the central socket and all arranged in the same diametrical plane parallel with each other and opening from the underside for receiving a corresponding number of marking pins —62— and —62'— which are similarly arranged in parallel relation in their respective sockets.

The upper ends of the pins are reduced in diameter and extend through correspondingly reduced openings in the upper end walls of the sockets to permit vertical movement of the plungers against the action of suitable retracting springs —63— which are arranged in their respective sockets and are interposed between the upper ends of the enlarged portions of the pins and said upper end walls of the sockets, as shown more clearly in Figures 2, 4 and 10.

The upper reduced ends of the marking pins are hollow and threaded internally for engagement by suitable screws —64— having heads —65— adapted to engage the upper face of the tool block for limiting the downward movement of the pins under the action of their respective springs and also for setting the marking pins so that their lower marking points will be normally disposed in approximately the same horizontal plane.

The object of this resilient mounting of the marking pins in the holder —59— is to permit their points to conform to the contour of the lens blank during the marking operation and also to permit the marking points to contact uniformly with the inking pad presently described.

The tool holder —59— is provided with diametrically opposite index lines —66— adjacent the periphery thereof and in alinement with the row of marking pins, presently described, to register with any one of the graduations on the upper face of the ring —54— as the tool holder is rotated thus permitting the marking pins to be positioned to any desired angle for marking the optical centers and axes upon the lens blank according to certain prescribed formulas required for the finished lenses, it being understood that the angular adjustment of the tool holder is effected by hand and for this purpose it is mounted to project slightly above the upper surface of its supporting ring —54—.

The block —59— may also be provided with additional resiliently mounted marking pins —62''— in uniformly spaced relation about the axis of the center pin —62— some distance therefrom for marking the lens at corresponding points to be used for gaging the thicknesses of the lens at those points so as to avoid the formation of prisms during the grinding operation.

An ink well support —67— is journaled in a suitable bearing —68— in the top wall of the frame —1— to rotate about a vertical axis in the longitudinal center of the machine and substantially coaxial with the axis of the tool holder —59— when the marking device is in its inking position, as shown in Figures 1 and 2 and also in Figure 7.

That is, the axis of rotation of the ink well support —67— is disposed in the vertical plane of travel of the center marking pin —62— and substantially the same distance from the axis of movement of the carrier —50— as the center marking pin.

An ink well —69— is eccentrically journaled upon the upper face of its supporting member —67— by means of an eccentric pin —70— engaged in a corresponding socket —71— and both at one side of the axis of the bearing —68—, as shown more clearly in Figure 2.

The ink well preferably comprises a circular cup-shaped base section —72— and a lid or cap-section —73— for receiving and inclosing an absorbent ink pad —74— which is normally seated on the bottom of and within the section —72— while the cover section —73— serves to protect the pad against accumulations of dust or other foreign matter and also to reduce evaporation of the moisture of the ink with which the pad is saturated.

The cover plate —73— is removable but when in operative position is held against rotation relatively to the section —72— by means of pins —75—, Figure 8, which enter corresponding apertures in the plate.

This cover plate is provided with apertures —76— arranged in position to correspond to the arrangement and positions of the marking pins —62—, —62'— and —62''— to allow the points of the marking pins to pass therethrough for engagement with the upper surface of the underlying ink pad —74—, as shown in Figures 2 and 4.

The object in eccentrically mounting the ink well upon its rotary support —67— is to present different portions of the pad to the marking pins as the latter are brought into contact therewith for inking purposes, it being understood that the cover plate —73— is locked to the section —67— and that the ink well —72— is rotatable relatively to those parts about the axis of the eccentric bearing —71—.

The object in rotatingly mounting the supporting member —67— for the ink well is to permit it, together with the well, to rotate with the tool-supporting block —59— when the latter is adjusted angularly to properly position the marking pins —62— and —62'— for marking the optical center and axis upon the lens blank.

Current may be supplied to the lamp —13— from any available source of power through a cable —B— having the conventional electric plug —C— adapted to be connected to any standard form of socket, the light circuit including therein a switch —D— mounted upon and within the housing —1—.

*Operation*

The amount of "drop" and also the amount of "inset" relatively to the optical center of the finished lens and the angle of the major optical axis relatively to the mechanical axes of the finished lens being predetermined by certain formula, the semi-finished blank is placed by hand upon the upper ends of the resilient posts —9— with its unfinished surface in contact therewith and its finished surface at the top.

The hand lever —31— may then be adjusted along the scale —32— to the graduation indicating the prescribed amount of drop of the lens segment below the optical center, after which the hand lever —40— may be adjusted along its scale —41— to one side or the other of the zero graduation to register with the graduation corresponding to the prescribed amount of inset, the graduations at one side of the zero mark being used for right eye lenses and those of the other side for left eye lenses.

These movements of the levers or pointers —31— and —40— cause corresponding movements of the pointer plates —26— and parts carried thereby, previously termed the segment locator, through the medium of the eccentric pins —29— and —33— on lever —24—.

The tool block —59— may then be adjusted rotarily to bring the marking pins —62'— to the prescribed angle indicated by the graduations on the upper surface of the ring —54— while the marker is in its inking position with the marking pins in contact with the pad —74—.

Now, assuming that the lamp —13— is energized by the closing of the switch —D— then the direct rays of light transmitted to the target —11'— will be reflected by the reflector —14— upwardly through the sight opening —6— and overlying portion of the lens —A— and particularly through the segment —A— to render the latter more clearly visible.

The pointer plate —26— is then rocked rearwardly to engage its points with the upper surface of the lens blank after which the points —44— may be adjusted by the rotation of the handle —49— to correspond to the diameter of the lens segment which is then moved by hand upon the posts —9— with its periphery against the gage —10— until the point of the plate —26— and points —44— of the segment locator are visually registered with three points in the periphery of the segment as previously explained thereby bringing the segment into proper position relative to the marking point of the center pin —62— representing the optical center of the finished lens.

The lens blank is now set ready for marking the optical center and major axis of the finished lens which is accomplished by moving the carrier —50— and marker mounted thereon from its rearward inking position forwardly to its marking position until the points of the marking point —62— and —62'— and marking pins —62"— are brought into contact with the upper surface of the lens to impress thereon the ink carried by the marking points of the pins after which the carrier —50— is returned to its inking position ready for a repetition of the operation upon other lens blanks.

The marks indicated on the surface of the lens blank by the pins —62— and —62'— determine the optical center and major axis of the finished lens so that the lens blank after being marked may be removed from the marking machine and placed upon the lap of a suitable grinding and polishing machine with the marked axis registered with the axial length of the lap, the unfinished surface of the lens blank being then ground and polished to the required contour such, for example, as a cylindrical surface for producing toric lenses.

When the lens is marked in the manner described the pointer plate —26— may be moved to its inactive position ready for a repetition of the operation upon other lens blanks, it being understood that the other adjustments of the segment locator may be made to indicate different amounts of "drop" and/or "inset" and that the tool holder —59— may also be adjusted for other angles of the major axis according to varying prescribed formulas.

Although the machine shown and described is particularly simple in construction and operation it is evident that various changes may be made in the detail construction without departing from the spirit of this invention.

When the lens blank is quadrilateral or more or less irregular in form and the segment is ground in the finished concave surface thereof the blank is placed on the posts with its convex surface in contact therewith and owing to the upward inclination of the marginal edges of the blank on the post it is free to shift laterally over the top of the gage —10— and in this case the top wall —1'— of the frame —1— would be provided with an extra gage as —10'—, the same distance from the center around which the posts are arranged and parallel with the gage —10— but preferably of less vertical height so that the lens may shift laterally across the upper surfaces of both gages when locating the position of the segment relatively to the marking point of the center marking pin of the marker which it will be remembered is coincident with the center point around which the posts are arranged.

What I claim is:

1. In a machine for marking lens blanks, a frame, supporting posts for the lens blank mounted on the frame around a common axis, a gage to which the segment of the blank may be set by adjustment of the blank upon its supporting posts, means for adjusting the gage in one direction to determine the amount of drop of the segment, additional means for adjusting the gage in another direction for indicating the amount of inset of the segment, and means operable at will for marking the optical center and major axis upon the lens blank when the latter is set to the gage.

2. In a machine for marking bifocal lens-blanks and for locating the position of the segment relatively to the marking point, a marker movable about a horizontal axis, means for supporting the lens-blank movably in the path of the marker to receive an impression therefrom, and a segment locator movable about an axis parallel with the axis of movement of the marker and having a portion thereof adapted to engage the face of the lens-blank.

3. In a machine for marking bifocal lenses and for locating the position of the segment relatively to the marking, a support upon which the lens is movably mounted, a segment locator having a pair of caliper jaws movable to different predetermined positions across the exposed surface of the lens and spaced apart to correspond to the diameter of the segment, said lens being movable upon its support to register diametrically opposite sides thereof with the caliper jaws, and means for marking the exposed surface of the lens at a point in fixed relation to its support.

4. In a machine for marking bifocal lenses and for locating the position of the segment relatively to the marking, a support upon which the lens is movably mounted, a segment locator having three indicator points movable to different positions across the exposed surface of the lens and arranged in spaced relation corresponding to three points in the perimeter of the segment, said lens being adjustable on its support to bring the three points of its segment into registration with the three points of the locator, and means for marking the exposed surface of the lens at a point in fixed relation to the lens support.

5. In a machine for determining the marking of a bifocal lens relatively to its segment, means for supporting the lens about a fixed point, a segment locator having three indicator points movable across the exposed surface of the lens relatively to said point to a certain prescribed position representing the amount of inset and the amount of drop which the segment should assume relatively to said point, said lens being movable on its supporting means to bring its segment into registration with said indicator points of the locator, and means for marking the lens at a point in registration with said fixed point.

ELI MAYNARD LONG.